(12) United States Patent
Pfaff et al.

(10) Patent No.: US 6,419,736 B1
(45) Date of Patent: *Jul. 16, 2002

(54) SULFIDE AND OXYSULPHIDE PIGMENTS

(75) Inventors: Gerhard Pfaff, Münster; Matthias Kuntz, Ober-Beerbach; Reiner Vogt, Kranichstein, all of (DE); Rodney Riddle, Dorset (GB); Sabine Schoen, Darmstadt; Wolf-Dietrich Weber, Reinheim, both of (DE)

(73) Assignee: Merck Patent Gesellschaft mit beschrankter Haftung (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/623,893

(22) PCT Filed: Mar. 11, 1999

(86) PCT No.: PCT/EP99/01572

§ 371 (c)(1),
(2), (4) Date: Nov. 13, 2000

(87) PCT Pub. No.: WO99/46336

PCT Pub. Date: Sep. 16, 1999

(30) Foreign Application Priority Data

Mar. 11, 1998 (DE) .................................. 198 10 317

(51) Int. Cl.[7] .................. C04B 14/20; C04B 14/04; C09C 1/62; C09C 1/02; C01F 17/00

(52) U.S. Cl. ................. 106/417; 106/403; 106/404; 106/461; 106/482; 423/263

(58) Field of Search ................. 106/417, 461, 106/403, 404, 482; 423/263

(56) References Cited

U.S. PATENT DOCUMENTS

| | | | | |
|---|---|---|---|---|
| 5,401,306 A | | 3/1995 | Raimund et al. | 106/417 |
| 5,401,309 A | * | 3/1995 | Chopin et al. | 106/461 |
| 5,755,868 A | * | 5/1998 | Macaudiere | 106/401 |
| 5,968,247 A | * | 10/1999 | Macaudiere | 106/401 |
| 6,267,810 B1 | * | 7/2001 | Pfaff et al. | 106/415 |

FOREIGN PATENT DOCUMENTS

| | | |
|---|---|---|
| EP | 0 620 254 | 10/1994 |
| EP | 0 608 930 | 11/1995 |
| FR | 2 755 971 | 5/1998 |
| FR | 2 758 545 | 7/1998 |

* cited by examiner

Primary Examiner—Mark L. Bell
Assistant Examiner—Patricia L. Hailey
(74) Attorney, Agent, or Firm—Millen, White, Zelano & Branigan, P.C.

(57) ABSTRACT

The present invention relates to rare earth metal sulfide or oxysulfide pigments and yttrium sulfide or oxysulfide pigments based on platelet-shaped substrates.

20 Claims, No Drawings

SULFIDE AND OXYSULPHIDE PIGMENTS

The present invention relates to sulfide and oxysulfide pigments which are based on platelet-shaped substrates coated with a sulfide or oxysulfide of a rare earth metal and/or of yttrium, and to their preparation and use, especially in car finishes, paints, inks, plastics and cosmetic formulations.

Rare earth metal sulfide and yttrium sulfide pigments without carriers, and their use in plastics, coating materials and cosmetics, are known from EP 0 203 838 B1. EP 0 545 746 B1 describes pigments comprising both a composition based on a sesquisulfide of a rare earth metal or of yttrium and a dopant.

In EP 0 620 254 B1 a pigment based on a rare earth metal sulfide or on yttrium sulfide is used as a carrier which is coated with a transparent oxide, preferably a metal oxide.

These known rare earth metal sulfide and yttrium sulfide pigments, although they can be employed to good effect as absorption pigments for numerous purposes, cannot be regarded as pearl lustre pigments owing to the absence of interference capacity and to deficient lustre.

It was therefore the object of the invention to provide rare earth metal sulfide or oxysulfide and yttrium sulfide or oxysulfide pigments having good opacity and strong colour shades, covering a relatively broad colour spectrum, and at the same time having the interference and lustre properties of pearl lustre pigments.

It has surprisingly now been found that, by coating platelet-shaped substrates with sulfides or oxysulfides of the rare earth metals (lanthanides) and of yttrium, pigments having advantageous coloristic properties are obtained.

On the platelet-shaped substrates it is possible to apply uniform sulfide or oxysulfide layers of rare earth metals and of yttrium which have a high lustre, give the pigment an attractive powder colour, and may possibly generate the interference colours of thin platelets.

The invention therefore provides sulfide and oxysulfide pigments which are based on platelet-shaped substrates, characterized in that the substrates are coated with a sulfide or oxysulfide of a rare earth metal and/or of yttrium.

The invention additionally provides a process for preparing the pigments of the invention and for the use of these pigments in formulations such as paints, varnishes, printing inks, plastics and cosmetics.

The substrates are coated with a sulfide of the rare earth metals or of yttrium having the formula $M_2S_3$, in which M is at least one element chosen from the group formed by the lanthanides of atomic numbers from 57 to 71 inclusive and yttrium. Preferably, $M_2S_3$ is a sesquisulfide of cubic $\gamma$-$Ce_2S_3$ or $\gamma$-$La_2S_3$. However, sulfide mixtures, such as $\gamma$-$Ce_2S_3$ and $\gamma$-$La_2S_3$, or mixed sulfides, such as $LaYS_3$, are also suitable. The coatings may additionally consist of oxysulfides of the formula $M_2S_{3-x}O_x$ (2.5<x<0.05)

A suitable platelet-shaped base substrate is any platelet-shaped material known to the person skilled in the art which is stable under the conditions of coating. Particular mention may be made here of natural and synthetic mica, kaolin, talc, vermiculite, $TiO_2$, $SiO_2$ and $Al_2C_3$ flakes, glass flakes, graphite, metal flakes, bismuth oxychloride, platelet-shaped iron oxide, LCPs (liquid crystal polymer pigments), holographic pigments and other platelet-shaped materials.

Preference is given to mica, such as muscovite or phlogopite, for example. The platelet-shaped substrate employed can, however, also comprise materials which already possess a metal oxide coating, especially mica or $SiO_2$ flakes with one or more coats of, for example, $TiO_2$, $ZrO_2$, $SnO_2$, $Al_2O_3$, $SiO_2$, $ZnO$ or mixtures of these metal oxides.

Other suitable substrate materials are thin metal flakes, which in some cases—as in the case of Al flakes, for example—are enveloped by a layer of a stabilizing compound of low refractive index, such as silica. Apart from Al flakes, other metal flakes employed include those of Ag, Ti, Cu/Zn and other metals.

The size of these platelet-shaped substrates is not critical per se, and it is therefore possible to use particles of the size appropriate for the intended application. In general, the substrate will be employed in particle sizes of from about 1 to 200 μm, in particular from about 5 to 100 μm. The thickness of the particles is generally from about 0.1 to 5 μm, in particular about 0.5 μm.

The starting materials used as substrates are known and can be prepared by known techniques. Mica particles of the desired size order can be obtained by wet or dry milling of mica followed by classification. Metal oxide-coated materials, especially metal oxide-coated mica flakes, can either be obtained commercially—for example, as Iriodin® pearl lustre pigment from Merck KGaA, Darmstadt, Germany—or can be prepared by known techniques. Such techniques are described, for example, in the following patents and patent applications: U.S. Pat. No. 3,087,828, U.S. Pat. No. 3,087,829, DE 19 59 998, DE 20 09 566, DE 22 14 545, DE 22 44 298, DE 23 13 331, DE 25 22 572, DE 31 37 808, DE 31 37 809, DE 31 51 343, DE 31 51 354, DE 31 51 355, DE 32 11 602, DE 32 35 107, WO 93/08237 and EP 0 763 573.

The pigments of the invention are prepared by adding a salt solution of a rare earth metal and/or of yttrium and optionally oxalic acid to an aqueous suspension of a platelet-shaped substrate, the pH of the suspension being optionally kept substantially constant, by simultaneous addition of a base, within a range which brings about hydrolysis of the added salt, and the pigment coated in this way with an oxide or oxide hydrate or oxalate is separated off, washed, dried, preferably at 80–150° C. for from 10 minutes to 1.5 hours, and calcined, preferably at 400–900° C. Finally, the product is calcined in an $H_2S$ gas stream or in a $CS_2$ or $H_2S/CS_2$ gas stream under inert gas for from 10 minutes to 2 hours at temperatures from 550 to 1200° C., preferably from 800 to 1000° C., in the course of which the oxalate or oxide of the rare earth metal and/or yttrium is converted to the sulfide or oxysulfide.

It is also possible to carry out the reaction with $H_2S$ or $CS_2$ in a fluidized-bed reactor (CVD process).

In order to conduct the CVD variant it is advisable, as is generally the case for CVD processes, to use a fluidized-bed reactor or tube furnace. The substrate particles to be coated are heated in the reactor, for example with fluidization by means of an inert fluidizing gas such as $N_2$ or argon, to the desired reaction temperature (generally from 400 to 900° C., preferably from 650 to 850° C.). The elemental sulfur or $H_2S$ and/or $CS_2$ is then introduced from separate nozzles with the aid of inert streams of carrier gas (advantageously sub-streams of the fluidizing gas) from upstream evaporator vessels, the sulfur concentration being held judiciously at from 0.5 to 5% by volume, preferably $\leq$2% by volume, based on the total amount of gas in the reactor.

In addition to compounds containing sulfur, particularly preferred sulfur donors include hydrogen sulfide and elemental sulfur.

If elemental sulfur is used, the procedure adopted is judiciously to render finely ground sulfur powder inert for about 1 to 4 h and then to heat it in the absence of oxygen to the reaction temperature, generally 400–1200° C., preferably 400–900° C. and, in particular, 600–850° C.

By depositing rare earth metal oxide or oxide hydrate layers or yttrium oxide or oxide hydrate layers in the presence of one or more dopants, selected, for example, from the group of alkaline earth metals and/or alkali metals, onto the platelet-shaped substrates, it is possible to produce particularly smooth, stable, defined and strongly coloured rare earth metal sulfide layers or yttrium sulfide layers, respectively. The dopant is in the form of an inclusion in the crystalline lattice of the sulfide layer $M_2S_3$ or the oxysulfide layer $M_2S_{3-x}O_x$. The dopant can be selected alone or in mixtures from the salts of alkali metals and/or alkaline earth metals; preference is given to the use of sodium or potassium. In the course of coating the platelet-shaped substrates with the oxide or oxide hydrate layer, the dopant is added in solid form or in aqueous solution in amounts, based on the substrate, of from 0.02 to 2.0% by weight, preferably from 0.05 to 0.2% by weight. The proportion of dopant in the sulfide layer or the oxysulfide layer is from 0.01 to 1.0% by weight, preferably from 0.05 to 0.5% by weight.

Particular preference is given to platelet-shaped substrates which have a cerium sulfide layer or an oxysulfide layer and are doped with sodium.

Depending on the desired effect, the sulfide layer or oxysulfide layer of the rare earth metals or of the yttrium can have thicknesses of up to about 400 nm, preferably from 10 to 300 nm. In these layers it is common to achieve contents of rare earth metal sulfides or of yttrium sulfides or of the corresponding oxysulfides which, based on the substrate, are from about 1 to 400% by weight, in particular from 5 to 300% by weight. Depending on the layer thickness of the sulfide or oxysulfide layer, interference colours are obtained which pass, with growing layer thickness, from silver via gold, red, violet and blue through to green and, finally, to higher-order interference colours.

With pigments containing not only a rare earth metal sulfide or yttrium sulfide layer or a corresponding oxysulfide layer, but also other layers (preferably 3 to 7 layers) of materials of high and low refractive index (preferably oxides) and, optionally, semitransparent metals (multilayer pigments) it is possible to obtain very strong angle-dependent colour effects (colour flop, goniochromaticity).

It is also possible to subject the finished pigment to an aftercoating or aftertreatment operation which further enhances the light stability, weathering stability and chemical stability or facilitates the handling of the pigment, especially its incorporation into various media. Examples of suitable aftercoatings and aftertreatments are the processes described in DE-C 22 15 191, DE-A 31 51 354, DE-A 32 35 017 or DE-A 33 34 598.

The additionally applied substances make up only about 0.1 to 5% by weight, preferably about 0.5 to 3% by weight, of the overall pigment.

The pigments of the invention are a major enrichment of the art. The powder colour, passing from orange to red, and the interference colour, which can be generated as desired, result in extremely interesting effects which can be exploited for numerous applications; in the case, in particular, of substrates which already themselves have an interference colour, this can be intensified and varied by means of the sulfide layer or oxysulfide layer. Areas of application arise both in cosmetics, where the pigments of the invention can be employed, for example, in nail varnishes, in make up, gels, powders, ointments, emulsions, lipsticks and other formulations, in concentrations of generally from 0.1 to 80% by weight, and in industry, for pigmentation of paints, other coating materials, printing inks or plastics, for example.

Plastics comprising the pigments of the invention in amounts of from 0.1 to 10% by weight, preferably from 0.1 to 5% by weight, are outstandingly suitable for laser marking using, for example, a $CO_2$ or Nd-YAG laser. The markings obtained are notable for their high contrast and definition.

The examples which follow are intended to illustrate the invention without limiting it:

EXAMPLES

Example 1

100 g of mica of particle size 10–60 $\mu$m are suspended in 2 l of water. At a pH of 5.5 and at 60° C., a solution of 26 g of $Ce(SO_4)_2.4H_2O$ in 420 ml of dilute sulfuric acid is metered in, the pH being kept constant by simultaneous dropwise addition of 25% sodium hydroxide solution. The mixture is stirred for 0.5 h and the product is separated off, washed with water, dried at 80° C. for 0.5 h, calcined first at 500° C. in a stream of argon for 0.5 h and finally at 950° C. in an $H_2S$/argon stream (10 l/h $H_2S$) for 1 h.

The resulting pigment has an intense orange colour and a high lustre.

Example 2

By the same procedure as in Example 1, 100 g of $SiO_2$ flakes of particle size 5 to 40 $\mu$m are coated with cerium sulfide. Relative to the pigment described in Example 1, the resulting pigment has an even more intense orange colour and increased lustre.

Example 3

Using the procedure of Example 1, 100 g of Iriodin® 103 rutile sterling silver ($TiO_2$-coated mica pigment of particle size 10 to 50 $\mu$m from Merck KGaA, Darmstadt, Germany) are coated with cerium sulfide. The resulting pigment has an intense orange-golden colour and a high lustre.

Example 4 a) 100 g of mica of particle size 10–60 $\mu$m are suspended in 2 l of DI water and the suspension is heated to 75° C. with continuous stirring. The pH of the suspension is adjusted to 6.0 using dilute hydrochloric acid (20%). During the addition of 650 ml of aqueous $CeCl_3$ solution (108 g of $CeCl_3.7H_2O$ in 600 g of DI water) the pH is held constant at 6.0 using 20% sodium hydroxide solution. After the end of the addition, stirring is continued in order to complete the precipitation. The resultant pigment is filtered off, washed then dried at 110° C. The $CeO_2$-coated mica pigment is of a white powder colour and exhibits a weak silvery interference.

b) 10 g of product from Example 4a) in a quartz boat are placed in a tube furnace having a quartz tube. The furnace is heated to 650° C. (200 cm$^3$/min) under argon. Thereafter, $H_2S$ gas is additionally passed through the system for 1 h. After the end of the reaction, the product is left to cool to room temperature under inert gas (argon). This gives a bright red pigment having a $\gamma$-$Ce_2S_3$ layer.

Example 5

10 g of product from Example 4a) are heated as in Example 4b) to 750° C. in a rotary tube furnace under nitrogen (200 cm$^3$/min). Subsequently, a stream of $H_2S$ (200 cm$^3$/min) is additionally passed through the system for 5 h. After the end of the reaction, the product is left to cool to room temperature under inert gas ($N_2$) The resultant cerium oxysulfide ($Ce_2OS_2$) -coated pigments possess a green mass tone and a high lustre.

Example 6 a) A $CeCl_3$ solution (68.4 g of $CeCl_3.7H_2O$ made up to 700 ml with DI water) and an oxalic acid solution ($H_2C_2O_4.2H_2O$ made up to 700 ml with DI water) are metered simultaneously but separately at 75° C. into a mica suspension (100 g of mica of particle size 10–60 μm). After the end of the addition, the pigments are washed, dried at 110° C. and calcined at 800° C.

b) 10 g of the cerium oxalate-coated mica pigments are heated to 900° C. in the tube furnace in a quartz boat under a stream of $N_2$ (200 cm³/min). Subsequently, a stream of $H_2S$ (200 m³/min) is additionally passed through the system at 900° C. for 4 h. After the end of the reaction, the product is left to cool to room temperature under inert gas ($N_2$). The reddish violet pigments prepared in this way have a β-$Ce_{10}S_{14}O$ coating.

What is claimed is:

1. Sulfide and oxysulfide pigments based on platelet-shaped substrates, characterized in that the substrate is coated with yttrium and/or one or more rare earth metal sulfides of the formula $M_2S_3$ or the corresponding oxysulfides of formula $M_2S_{3-x}O_x$, in which M is at least one element selected from the group formed by the lanthanides and yttrium, and 2.5<X<0.05.

2. Pigments according to claim 1, characterized in that the rare earth metal sulfide or oxysulfide is a sulfide or oxysulfide of cerium, neodymium, praseodymium, samarium, gadolinium, terbium, dysprosium, erbium or thulium.

3. Pigments according to claim 1, characterized in that the platelet-shaped substrate comprises mica flakes, $SiO_2$, $TiO_2$ or $Al_2O_3$ flakes, glass flakes, graphite, bismuth oxychloride or platelet-shaped metal oxides, uncoated or coated one or more times.

4. Pigments according to claim 1, characterized in that the mass of rare earth metal sulfide or oxysulfide, based on the overall pigment, is from 1 to 400% by weight.

5. Pigments according to claim 1, characterized in that the rare earth metal sulfide layer or oxysulfide layer is doped with one or more alkali metals and/or alkaline earth metals.

6. Pigments according to claim 5, characterized in that the doping element is present in amounts of from 0.01 to 1.0% by weight, based on the sulfide layer or oxysulfide layer.

7. Pigments according to claim 5, characterized in that the doping element is sodium or potassium.

8. Pigments according to claim 1, characterized in that a platelet-shaped substrate has a layer of sodium-doped cerium sulfide $Ce_2S_3$.

9. Process for preparing pigments according to claim 1, characterized in that a solution of a salt of a rare earth metal and/or yttrium and optionally an oxalic acid solution is added to an aqueous suspension of a platelet-shaped substrate and, optionally, a dopant in solid form or as an aqueous solution is added to the suspension, the pH of the suspension optionally being kept substantially constant by simultaneous addition of a base within a range which brings about hydrolysis of the added salt, and the pigment coated in this way with an oxide or oxide hydrate or oxalate is separated off, washed, dried and optionally calcined first at from 400 to 800° C. and finally converted into the sulfide or oxysulfide in the presence of sulfur compounds, $CS_2$, sulfur or hydrogen sulfide at, from 550 to 1200° C.

10. Process according to claim 9, characterized in that the dopant comprises one or more alkali metal salts and/or alkaline earth metal salts.

11. A car finish, a paint, a varnish, a printing ink, a plastic or a cosmetic comprising one or more pigments according to claim 1.

12. Formulations comprising pigments according to claim 1.

13. A sulfide or oxysulfide pigment comprising:
   a platelet-shaped substrate coated with yttrium and/or at least one rare earth metal sulfide of the formula $M_2S_3$, or a corresponding oxysulfide of formula $M_2S_{3-x}O_x$, where
   M is, independently, an element of the lanthanide group or yttrium, and 2.5<X<0.05.

14. A pigment according to claim 13, wherein each M is the same element of the lanthanide group or yttrium.

15. A pigment according to claim 13, wherein the rare earth metal sulfide of the formula $M_2S_3$ is a sesquisulfide of cubic γ-$Ce_2S_3$, γ-$La_2S_3$, or a mixture thereof.

16. A pigment according to claim 13, wherein the rare earth metal sulfide of the formula $M_2S_3$ is a mixed sulfide.

17. A pigment according to claim 13, wherein the rare earth metal sulfide of the formula $M_2S_3$ is a sulfide of $LaYS_3$.

18. A pigment according to claim 13, wherein the substrate is muscovite or phlogopite.

19. A pigment according to claim 13, wherein the substrate is a $SiO_2$ flake with one or more coats of $TiO_2$, $ZrO_2$, $SnO_2$, $Al_2O_3$, $SiO_2$, ZnO, or mixtures thereof.

20. A pigment according to claim 13, wherein the substrate is a metal flake of Al, Ag, Ti, or Cu/Zn.

* * * * *